United States Patent [19]

Hopkins

[11] 4,184,027
[45] Jan. 15, 1980

[54] RECYCLE CONTROL SYSTEM FOR CONTINUOUS POLYMERIZATION

[75] Inventor: Byrd Hopkins, Longmeadow, Mass.

[73] Assignee: Monsanto Company, St. Louis, Mo.

[21] Appl. No.: 452,303

[22] Filed: Mar. 18, 1974

Related U.S. Application Data

[63] Continuation of Ser. No. 192,244, Oct. 26, 1971, abandoned.

[51] Int. Cl.² ............................................. C08F 2/00
[52] U.S. Cl. .................................. 526/60; 260/95 A; 526/68
[58] Field of Search ............ 260/95 C, 95 A; 526/60, 526/68

[56] References Cited

U.S. PATENT DOCUMENTS

| | | | |
|---|---|---|---|
| 2,556,851 | 6/1951 | Ohsol | 260/95 C |
| 2,634,257 | 4/1953 | Faragher | 260/95 C |
| 2,989,517 | 6/1961 | Hanson | 260/95 C |
| 3,130,187 | 4/1964 | Tolin | 260/95 A |
| 3,341,622 | 9/1967 | Leibson | 260/95 C |
| 3,794,471 | 2/1974 | Latinen | 23/252 R |

*Primary Examiner*—Paul R. Michl
*Attorney, Agent, or Firm*—Joseph S. Nelson; William J. Farrington; James C. Logomasini

[57] ABSTRACT

A system for controlling the percent of polymer in a reactor in a process in which the reactor effluent, comprising a mixture of polymer, unreacted materials and, possibly, by-products, goes through a separator to remove from such effluent unreacted materials and by-products. The system is especially useful with variable fillage, horizontal continuous stirred tank reactors.

3 Claims, 7 Drawing Figures

RECYCLE CONTROL SYSTEM FOR CONTINUOUS POLYMERIZATION

This is a continuation of application Ser. No. 192,244, filed Oct. 26, 1971, now abandoned.

BACKGROUND

In continuous polymerization processes, especially those of the mass type, it is common to conduct a polymerization reaction in a reactor until a predetermined level of conversion is reached after which a fluid mass comprising a mixture of unconverted monomer and polymer is fed to a separator where, by physical means, monomer is separated from polymer. Monomer is then optionally and preferably recycled while polymer product is then removed from the system. A common example is the continuous mass polymerization of styrene to polystyrene followed by devolatilization of the heated viscous mixture to polymer and monomer to separate out unreacted styrene for recycle.

In such a continuous process in which many control schemes may be used it is common to regulate the level of reactants in the reactor, and to charge monomer to, or remove a product mixture from, the reactor or both, at respective rates which maintain the reactor at a predetermined fill level, the reactor pressure and temperature being controlled at predetermined respective values so as to achieve a desired level of conversion of monomer to polymer. To regulate fill level in a reactor, one may conventionally employ a level control assembly which directly controls fluid fill level in the reactor or one may conventionally employ weigh cells which weigh the quantity of materials in the reactor and indirectly control fluid fill level therein. Appropriate signal generating and feedback loops then function to regulate the quantities of monomer fed to, or reaction product removed from, the reactor.

Such conventional continuous process controls work well with conventional reactors, such as those of the vertically stirred kettle or plug-flow type. Recently, however, a different type of reactor has come into use which is of the horizontally continuously stirred tank type, and wherein a mixer assembly therein during operation functions periodically (with each revolution) to sweep out substantially the entire interior volume of the reactor making level sensors difficult to place. This latest reactor, in addition, has a capacity to be operated at variable fillage levels, and, furthermore, the churning action of the mixer assembly therein tends to make the fill level, and reactor gross weight measurement, variable depending on such variables as the quantity of reactants in the reactor instantaneously and the mixer rotational speed. When such a reactor is large relative to the quantity of reactants therein, it can be difficult to accurately weigh differentially and incrementally the quantity of monomer added thereto or of polymer removed therefrom. For these and other reasons those skilled in the art will appreciate, it can be exceedingly difficult to control reactor throughput rates, fill levels, and percent conversion when using such a type of reactor.

There has now been discovered, however, a control system for use in continuous polymerization processes involving one or more zones of polymerization followed by one or more zones of separation which does not involve the use of reactor level control means or of reactor weigh cells and which is especially well adapted for use with such a variable capacity horizontally continuously stirred tank reactor as just described. This control system is simple to operate and economical to construct. It not only controls the relative quantity of polymer in reactor effluent fed to separator but also controls reactor fill level. Monomer feed rate to reactor is fixed at a predetermined value, as are the reactor pressure and temperature. Only reactor effluent comprising a mixture of polymer and monomer is varied. This control system thus both overcomes the disadvantages of prior art control systems and makes possible new and highly convenient and economical continuous polymerization procedures.

SUMMARY

The present invention is directed to an apparatus and method for controlling the material balance and weight fraction of polymer in a reactor and is especially well adapted for use in continuous polymerization reactions.

The apparatus includes a variable fillage reactor means and a separator means. The reactor means is adapted for the continuous polymerization of monomer to produce a fluid product comprising a mixture of unreacted material and polymer. The separator means is adapted for continuous physical separation of such unreacted material from such mixture.

A first flow regulating means, which is preset and includes conduit means, functionally interconnects the reactor means with a monomer supply, such first flow regulating means is adapted to feed into the reactor means predetermined fixed quantities of monomer. A second flow rate regulating means, which includes conduit means, functionally interconnects the reactor means with the separator means. Such second flow rate regulating means is adapted to regulate the quantity of such mixture fed to the separator means from the reactor means in response to a signal fed thereto. Flow rate measuring means is functionally interconnected with the separator means and is adapted to measure the quantity of unreacted material so separated from such mixture in the separator means. The flow rate measuring means is further adapted to generate a flow rate signal representative of such measurement.

A signal generating means adapted to generate a prechosen set signal is provided. A flow rate control means which is adapted to compare the flow rate signal (generated by feed flow rate measuring means) with the prechosen set signal (generated by feed signal generating means) is provided. This flow rate control means generates an output signal representative of any difference between the flow rate signal and the prechosen set signal.

Signal interconnecting means functionally joins the signal generating means with the flow rate control means, the flow rate measuring means with the flow rate control means, and the flow rate control means with the second flow rate regulating means. Thus, the quantity of mixture so fed from the reactor means to the separator means through the second flow rate regulating means contains a predetermined quantity of unreacted material.

Optionally and preferably, the apparatus includes collection and conduit means whereby monomers separated from the mixture of unreacted material and polymer are fed back to the reactor means from the separator means. Also optionally and preferably, the apparatus includes both preset temperature regulating means and preset pressure regulating means. The preset first flow rate regulating means is conveniently and conventionally operated by a flow controller.

The method of this invention is adapted for use in a continuous polymerization reaction having both a reaction zone wherein monomer is polymerized to polymer, and a separation zone in which unreacted material is separated from polymer. The polymerization is conducted so that total consumption of monomer does not occur in the reaction zone and wherein substantially complete separation of unreacted material from polymer made in the reaction zone is accomplished in at least one subsequent separation zone. Interconnecting the reaction zone with the separation zone is a flow regulating means.

The feed rate of monomer to the reaction zone is maintained at a prechosen constant value, and the effluent rate from the reaction zone is regulated to control the flow rate of unreacted material from the separation zone at a prechosen constant value. Thus, the total feed of unreacted material and polymer in the reaction zone automatically tends toward a steady state value at which the weight fraction of polymer in the reaction zone is determined by a fixed relationship.

The steps of the method of this invention thus involve first continuously feeding monomers to the reaction zone at a constant prechosen rate, then a mixture of unreacted material and polymer is removed from the polymerization zone and fed to the separation zone through flow regulating means.

In the separation zone, at least a predetermined set percentage of the unreacted material is separated from the polymer. The flow rate of unreacted material so separated in the separation zone is measured and a signal representative of such measurement is generated.

The flow rate signal so generated is compared with a prechosen set signal and a control signal is thus produced. This control signal is fed to the flow regulating means to regulate the flow rate of the mixture removed from the reaction zone and fed to the separation zone. Thus, one achieves the desired control of material balance of weight fraction of polymer in the reaction zone.

Optionally and preferably, the method of the invention is practiced so that at least a portion of the unreacted material so separated is returned to the reaction zone.

DRAWINGS

The present invention is better understood by reference to the attached drawings wherein.

Figure 2:
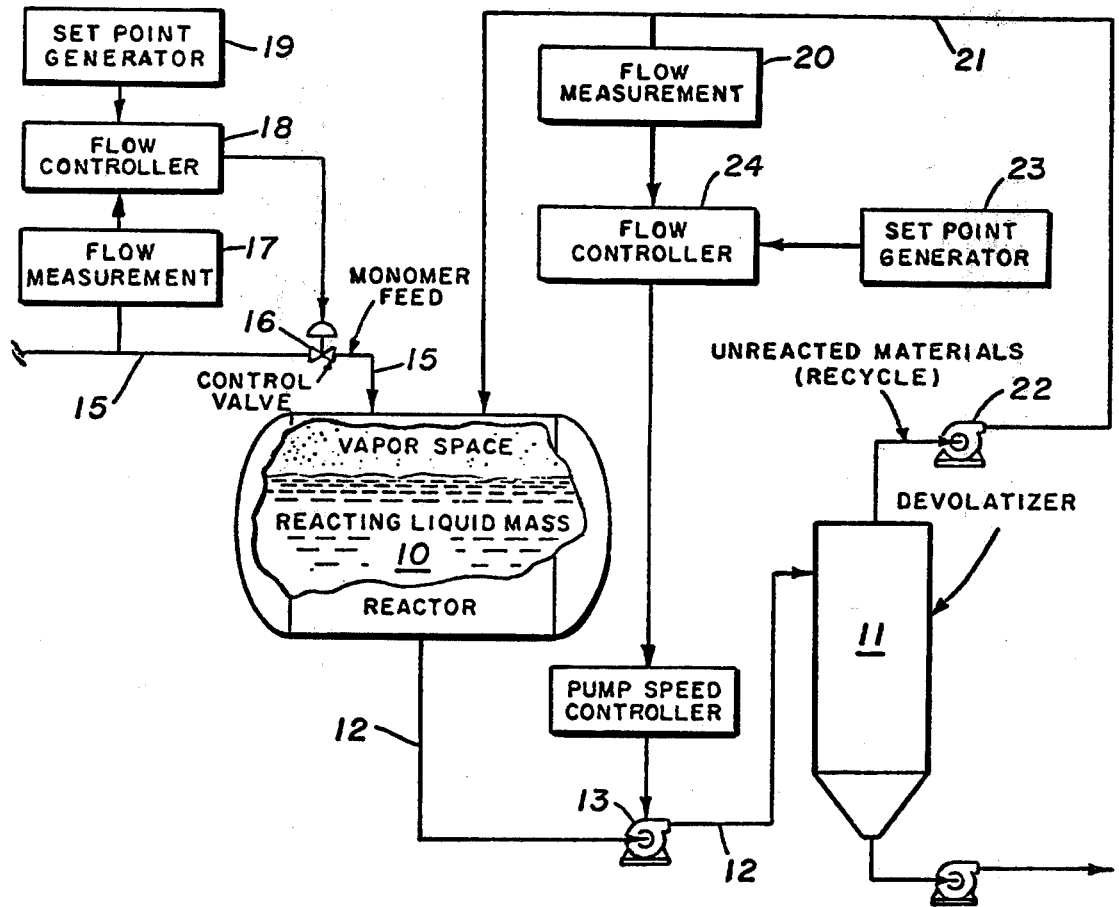
FIG. 2 is a schematic diagram illustrating a simple embodiment of the present invention being used with a single reactor and a single separator.
Figure 3A:
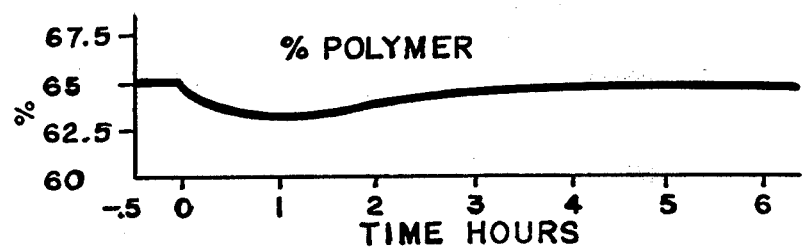
Figure 3B:
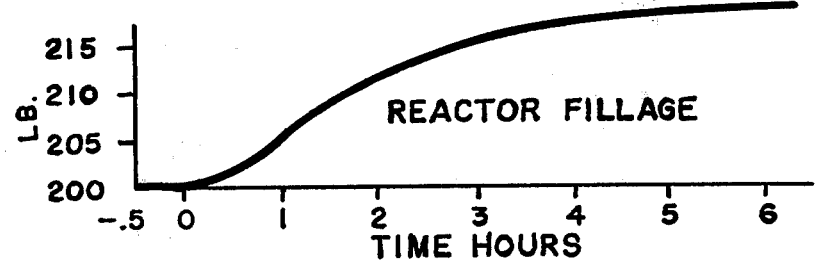
Figure 3C:
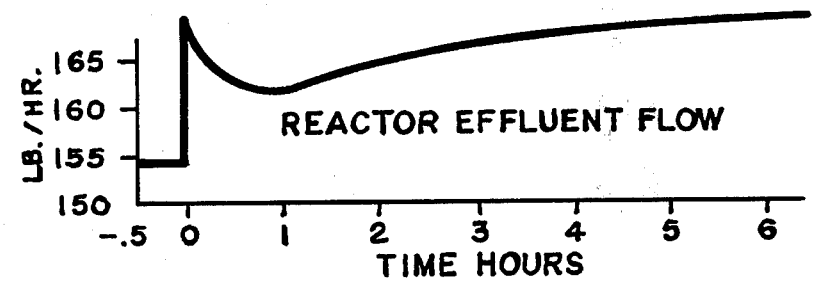
Figure 3D:
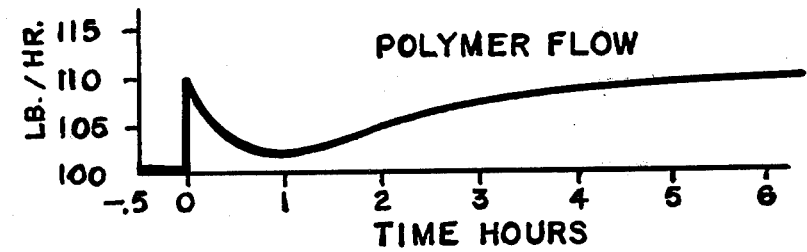
Figure 4:
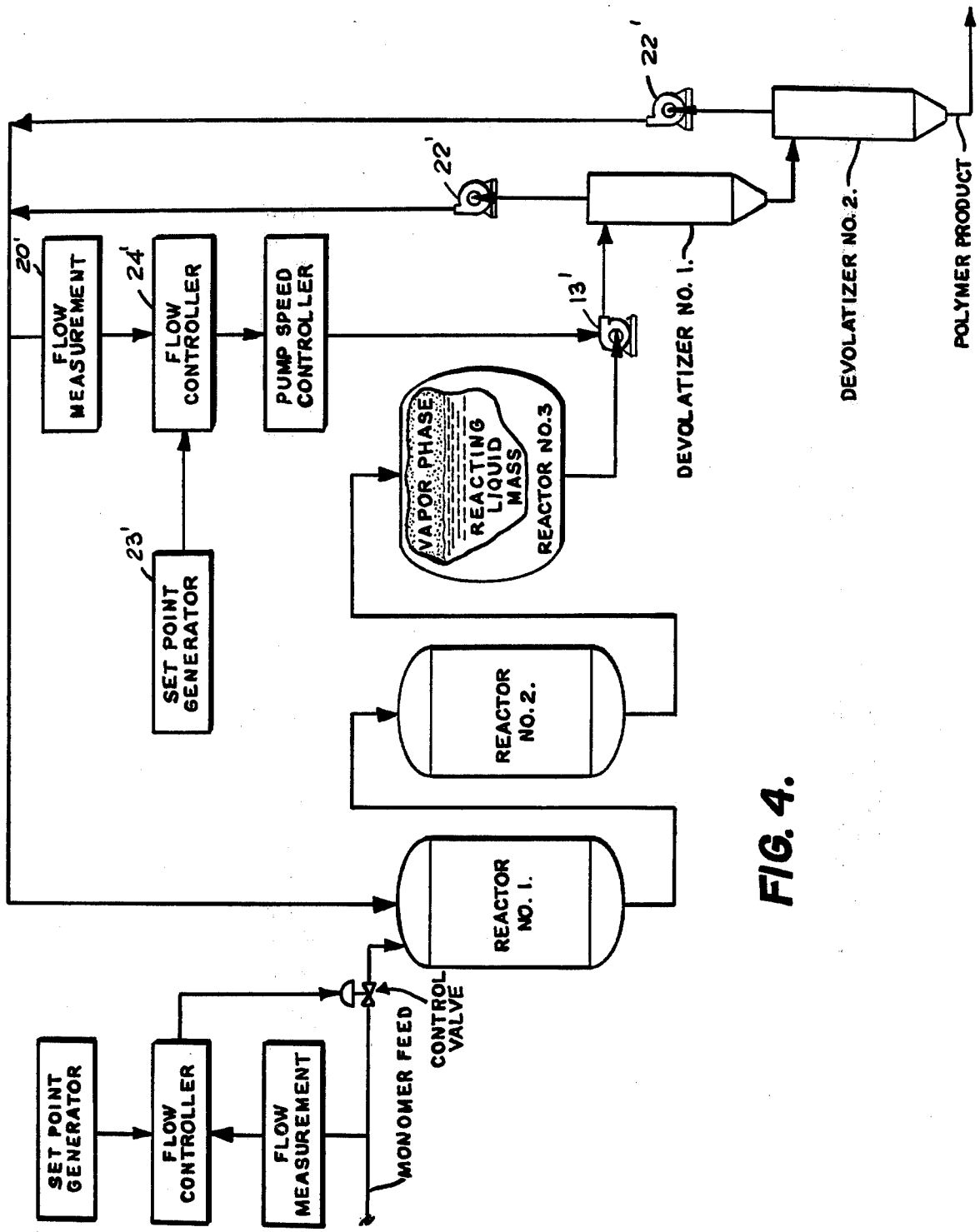

FIG. 3, Parts A, B, C, and D illustrate how the control system of FIG. 2 operates to regulate weight percent polymer produced in reactor fillage, reactor effluent flow rate, and percent polymer in reactor effluent in response to a sudden 10 percent by weight increase in monomer feed rate to the reactor; and FIG. 4 is a schematic diagram illustrating an embodiment of the present invention being utilized with a plurality of reactors followed by a plurality of separators.

DETAILED DESCRIPTION

Figure 1:
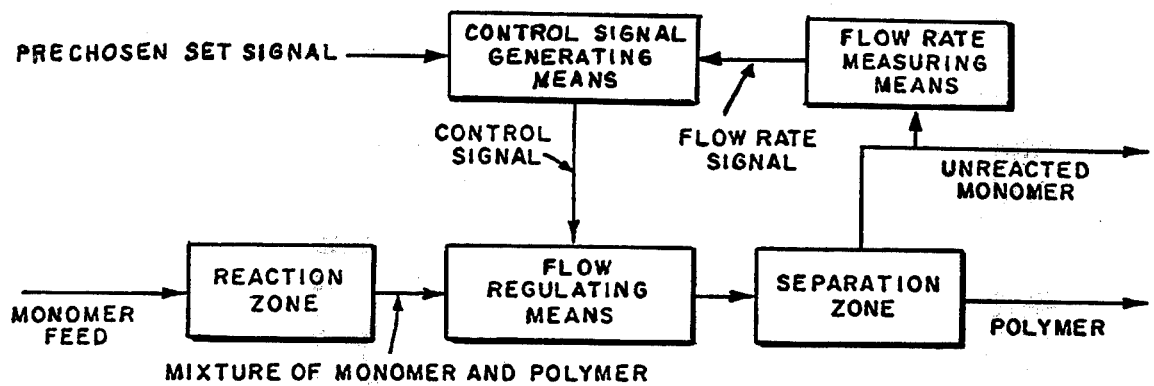
FIG. 1 is a generalized block diagram illustrating the control system of the present invention.

Turning to FIG. 1, there is seen illustrated the system of the present invention. Since this Figure is complete with legends, no separate figure numbers are employed in the description thereof herein. Monomer material is fed continuously and at a generally constant rate to a reaction zone wherein polymerization occurs and the monomer is converted to polymer. The polymerization reaction may be allowed to proceed to any desired point, but, typically and preferably, for purposes of the present invention, the monomer is not completely converted to polymer and the mixture of polymer and monomer is in the form of a liquid, typically at elevated temperature. From the reaction zone, the mixture of unreacted material and polymer is fed to the separation zone through a flow regulating means. The separation zone itself can be of any conventional form, such as a devolatilizer, a filter, a centrifuge, or the like. The reaction zone is typically a vessel of some sort equipped with temperature regulating means and pressure regulating means. The flow regulating means can be likewise of any conventional type such as a displacement pump, a control valve, or the like. In general, as those skilled in the art appreciate, the mixture of unreacted material plus polymer from the reaction zone is treated in the separation zone so as to separate the unreacted material from polymer. The unreacted material need not be, but usually does contain, a significant percentage of unreacted monomer along with (optionally or preferably), depending on circumstances, additional quantities of low molecular weight polymer, diluents (which are preferably liquid and solvents for either the monomer or the polymer) and catalysts, and the like. Preferably, mass polymerization is used.

The unreacted material is separated from polymer in the separation zone. Sometimes several separation zones in a series or parallel relationship one to the other may be employed depending upon the efficiency of separation, throughput rates, economic considerations, and the like. The conditions of polymerization and the conditions of separation, and the choice of flow regulating means, are generally not part of the present invention, are well known to the prior art, and do not form a part of the present invention, so no detailed individual description thereof is given herein. The flow of unreacted material separated from the polymer in the separation zone, for purposes of the process of the present invention, is measured. Once the flow rate has been measured, a signal representative of the flow rate is generated. The flow rate signal is then compared with a prechosen set signal to produce a control signal.

Finally, the control signal so produced is fed to the flow regulating means to regulate the flow rate of the mixture removed from the reaction zone and fed to the separation zone. Thus, one achieves the desired control of material balance and weight fraction of polymer in the reaction zone according to the following relationship:

$$\text{Weight fraction polymer} = \frac{\text{monomer feed flow rate}}{\text{monomer feed flow rate + unreacted material flow rate}} \quad (1)$$

Turning to FIG. 2, there is seen one embodiment of the system of the present invention. Here, a variable fillage reactor means 10 is employed with a devolatilizer means 11. Interconnecting the reactor means with the devolatilizer means is a conduit 12 in which is functionally mounted a pump 13. Pump 13 can be of any conventional type suitable for the movement of relatively viscous fluids therethrough. For example, pump 13 can be a gear pump. Connected with reactor 10 is a conduit means 15 through which monomer is supplied to reactor 10. To feed monomer to reactor 10 at a predetermined fixed rate, control means is provided. This control means may be of any conventional type. Here, such control means utilizes a control valve 16, for example, one of the pneumatic type. A flow measuring means 17, for example, a differential pressure measurement across an orifice (presently preferred), a turbine meter, a positive displacement meter, or the like, is used to generate a signal representative of the flow of monomer through conduit 15. A signal representing the flow rate of monomer through conduit 15 is thus generated by flow measurement means 17 and is fed to a flow controller 18. Flow controller 18 can be a conventional proportional-integral controller. A set point generator 19 is used to generate a predetermined signal and this signal is fed to the flow controller 18. The flow controller 18 compares the signals from the flow measurement means 17 and from the set point generator 19 and generates an output signal. This output signal is then fed to control valve 16 which causes control valve 16 to govern the flow of monomer therethrough at a rate which is prechosen and which is represented by the signal output from the set point generator 19.

From reactor 10 through conduit 12 is continuously taken a mixture of polymer product and unreacted material (which may be in the form of a liquid solution or dispersion) which is moved with the aid of pump 13 into devolatilizer (for example, one of the wiped film or of the falling strand type). Polymer product (typically in the form of a melt) is removed for further and final processing (not part of this invention) from devolatilizer 11 (from the bottom thereof in the embodiment shown). Unreacted material separated from polymer is taken from devolatilizer 11, optionally condensed from a vapor to a liquid condition by conventional means not shown in FIG. 1, and recycled to reactor 10, as through a conduit 21 via a pump 22. Usually separation of polymer from unreacted material is substantially complete so that, at most not more than a few percent of unreacted material (especially monomer), and preferably less than one percent (based on total product weight) of unreacted material remains in the polymer following separation (here accomplished in devolatilizer 11), although occasionally significantly larger percentages of unreacted material may be present in polymer product, depending upon equipment and processing conditions employed.

The flow rate of unreacted material so separated from polymer is measured by a flow measuring means 20, for example, a differential pressure measurement across an orifice, or the like, and a signal is generated which is representative of the flow of unreacted material through conduit 21 from devolatilizer 11. To compare the thus generated flow rate signal, a prechosen set signal is generated, as in a set point generator 23. This set signal is chosen so as to satisfy formula (1) above. Then, this flow rate signal and this set signal are compared by a device, such as a conventional flow controller 24, e.g. a proportional-integral controller, or the like. The flow controller 24, from such comparison, generates an output signal which can be regarded as a control signal.

Such control signal is fed to a flow regulating means, such as a pump speed controller which, in turn, regulates the flow rate of mixture through conduit 12 by regulating the pumping speed of pump 13. Thus, one achieves the desired control of material balance and weight fraction of polymer in reactor 10.

In FIG. 4 is illustrated another embodiment of the present invention. Here, a monomer feed enters a first reactor (designated reactor No. 1), is partially polymerized, and the product mixture fed to a second reactor (designated reactor No. 2). The product mixture is then fed to a third reactor (designated reactor No. 3). Other reactants and additives may be added, for example, to the second and third reactors, if desired. Monomer feed is fed to the first reactor at a predetermined fixed rate by any convenient control means. Here, for simplicity, a control means like that employed in the system of FIG. 2 is used. The third reactor is one of the variable fillage type.

The mixture of polymer product and unreacted material (which may be in the form of a liquid solution or dispersion) is, as in the system of FIG. 2, moved with a pump 13' into a first devolatilizer (designated devolatilizer No. 1). Polymer product, typically in the form of a melt is removed for further and final processing from the second devolatilizer. Although not part of this invention, such final processing may typically involve extruding, stranding, quenching, chopping, and bagging. As in the system of FIG. 2, the flow rate of unreacted material separated from polymer in first and second devolatilizers is measured, as by a flow measuring means 20', and the technique of regulating the flow of mixture through pump 13' employed in the system of FIG. 2 is again utilized. Numerals with prime marks appended thereto indicate in FIG. 4 analogous components to those used in the system of FIG. 2. The desired control of material balance and weight fraction of polymer in the third reactor is obtained. Observe that the present invention thus may be utilized with a series of reactors, only one of which is of the variable fillage type, followed by a series of separators of any desired type.

EMBODIMENT

The following example is set forth to illustrate more clearly the principles and practice of this invention to one skilled in the art and it is not intended to be restrictive but merely to be illustrative of the invention herein contained. All parts are parts by weight unless otherwise indicated.

EXAMPLE 1

To a horizontal continuously stirred tank reactor of the Latinen type having a two bladed, horizontally rotating paddle assembly with slots at diagonally opposite corners hereof is continuously charged, in liquid spray form, styrene monomer through an input port. The fresh monomer charge rate is about 100 pounds/hour and the temperature of the so-charged liquid styrene monomer is about 60° F. Concurrently, after steady state conditions are achieved, there is continuously withdrawn from the reactor through an output port a polymerized melt product at a flow rate of about 154 pounds/hour. The polymerized melt product comprises approximately 65 weight percent polystyrene dissolved in the balance up to 100 weight percent styrene monomer.

The reactor is maintained at about 65 percent volumetric fillage level based on the substantially unexpanded liquid phase at 327° F. and the paddle assembly rotates therein at about 12 RPM. The contents of the reactor are maintained in a substantially homogeneous and substantially isothermal condition. The reactor is jacketed and fluid is circulated in the jacket at desired reactor temperature.

The reactor is equipped with reflux condenser which is interconnected with the reactor at an input port. Vaporized styrene monomer is removed from the upper vapor phase portion within the reactor and passed into this condenser. The monomer vapor is condensed and sub-cooled to about 60° F. in the reflux condenser and is then returned to the reactor. The rate of monomer vapor removal is adjusted so as to maintain the temperature in the reactor interior at desired reactor temperature (e.g. about 327° F.) and so as to maintain a desired pressure in the reactor (e.g. about 21 psia.).

The mixture of polystyrene and unreacted material withdrawn from the reactor is continuously pumped into a wiped film devolatilizer where all unreacted monomer except for about 1 percent (based on total weight of polymer product) is removed from the polymer. The pressure in this devolatilizer is about 100 mm Hg absolute.

The apparatus and control system used here are similar to those above described in reference to the system of FIG. 1. Excellent control of process variables is obtained. The controls operate to compensate for substantially all process variations (disturbances) and to bring the process to the throughput rate and weight fraction of polymer in the reactor as initially prechosen.

The effect of changing the conditions from steady state, and the ability of the present control system to govern the situation is illustrated by the plots comprising FIG. 3. In FIG. 3, Part A shows the response of the percent polymer in the reactor; Part B shows the response of the reactor fillage; Part C shows the reactor effluent flow rate and Part D shows the polymer product flow rate as a function of time.

When the unreacted material flow rate is increased from 54 pounds/hour to 59.4 pounds/hour and the styrene monomer feed flow rate is increased from 100 pounds/hour to 110 pounds/hour (arbitrarily, for control evaluation purposes), it is observed that process conditions restabilize within about 2 hours to produce control of material balance and weight fraction of polymer in the reactor.

What is claimed is:

1. A method for controlling material balance and weight fraction of polymer in a continuous polymerization reaction producing a mixture of unreacted material and polymer having (a) a variable fillage horizontal continuously stirred and reflux cooled reaction zone wherein monomer is polymerized to polymer, (b) a separation zone in which unreacted material is separated from polymer, and (c) a flow regulating means therebetween, the feed rate of monomer to said reaction zone being maintained at a prechosen constant value, and the effluent rate from said reaction zone being regulated to control the flow rate of unreacted material from said separation zone at a prechosen constant value, so that the total weight of unreacted material and polymer in said reaction zone automatically tends toward a steady value at which the weight fraction of polymer in said reaction zone will be determined by the following relationship:

$$\text{Weight fraction polymer} = \frac{\text{monomer feed flow rate}}{\text{monomer feed flow rate} + \text{unreacted material flow rate}}$$

said method comprising the steps of:
(A) feeding continuously and at a constant prechosen rate monomers to said reaction zone,
(B) removing through said flow regulating means a mixture of unreacted material and polymer from said polymerization zone and feeding such mixture to said separation zone,
(C) separating in said separation zone at least a predetermined weight percentage of said unreacted material from said polymer,
(D) measuring the flow rate of unreacted material so separated in said separation zone and generating a signal representative of said flow rate,
(E) comparing said flow rate signal with a prechosen set signal to produce a control signal, and
(F) feeding said control signal to said flow regulating means to regulate the flow rate of said mixture so removed from said reaction zone, thereby to achieve the desired control of said material balance and said weight fraction of polymer in said reaction zone.

2. The method of claim 1 wherein at least a portion of the said unreacted material so separated is returned to said reaction zone.

3. The method of claim 1 wherein the reaction is a continuous polymerization of styrene, the monomer comprises styrene and the unreacted material comprises styrene monomer.

* * * * *